(12) United States Patent
Gabrys et al.

(10) Patent No.: US 7,523,773 B2
(45) Date of Patent: Apr. 28, 2009

(54) NON-PNEUMATIC WHEEL

(75) Inventors: Jonathan W. Gabrys, Downingtown, PA (US); Ryan S. Lee, St. David, PA (US)

(73) Assignee: The Boeing Company, Chicago, IL (US)

(*) Notice: Subject to any disclaimer, the term of this patent is extended or adjusted under 35 U.S.C. 154(b) by 9 days.

(21) Appl. No.: 11/255,521

(22) Filed: Oct. 21, 2005

(65) Prior Publication Data

US 2007/0089820 A1 Apr. 26, 2007

(51) Int. Cl.
*B60B 9/04* (2006.01)
(52) U.S. Cl. .................. 152/86; 152/69; 152/80
(58) Field of Classification Search .............. 152/5, 152/7, 11, 12, 69, 72, 75, 80, 86
See application file for complete search history.

(56) References Cited

U.S. PATENT DOCUMENTS

| | | | | | |
|---|---|---|---|---|---|
| 52,422 | A * | 2/1866 | Lane | .................. | 152/12 |
| 94,839 | A * | 9/1869 | Reed | .................. | 152/80 |
| 691,717 | A * | 1/1902 | Furmidge | .................. | 152/86 |
| 882,697 | A * | 3/1908 | Kumler | .................. | 152/86 |
| 1,014,541 | A * | 1/1912 | Walker et al. | .................. | 152/86 |
| 1,025,981 | A * | 5/1912 | John | .................. | 152/86 |
| 1,063,530 | A * | 6/1913 | Glenn | .................. | 152/12 |
| 1,065,080 | A * | 6/1913 | Radke | .................. | 152/12 |
| 1,102,665 | A * | 7/1914 | John | .................. | 152/80 |
| 1,162,706 | A * | 11/1915 | Myers | .................. | 152/86 |
| 1,260,655 | A * | 3/1918 | Fahrney | .................. | 152/12 |
| 1,532,911 | A * | 4/1925 | McLain | .................. | 152/12 |
| 1,595,192 | A * | 8/1926 | Heneka | .................. | 152/86 |
| 2,022,153 | A * | 11/1935 | Rogers | .................. | 188/264 W |
| 3,182,705 | A * | 5/1965 | Markow | .................. | 152/12 |
| 3,942,839 | A * | 3/1976 | Chalk | .................. | 301/73 |
| 4,553,577 | A * | 11/1985 | Gregg | .................. | 152/12 |
| 5,125,443 | A * | 6/1992 | Schwartzman | .................. | 152/84 |
| 5,676,900 | A | 10/1997 | Pajtas | | |
| 6,064,123 | A * | 5/2000 | Gislason | .................. | 290/55 |
| 6,170,544 | B1 | 1/2001 | Hottebart | | |
| 6,612,656 | B2 * | 9/2003 | Koschinat | .................. | 301/6.3 |
| 6,640,859 | B1 | 11/2003 | Laurent et al. | | |
| 6,698,480 | B1 | 3/2004 | Cornellier | | |
| 7,201,194 | B2 * | 4/2007 | Rhyne et al. | .................. | 152/5 |
| 2002/0096237 | A1 * | 7/2002 | Burhoe et al. | .................. | 152/11 |

FOREIGN PATENT DOCUMENTS

| | | | |
|---|---|---|---|
| DE | 3222127 | * | 12/1983 |
| EP | 0301553 | * | 7/1988 |
| GB | 2109752 | * | 6/1983 |
| JP | 61-244601 | * | 10/1986 |
| JP | 62-96101 | * | 5/1987 |

OTHER PUBLICATIONS

Mayerson, Norman, "Reinventing the Wheel," New York Times, Section D10, Jan. 3, 2005, New York, NY (4 pages).

(Continued)

*Primary Examiner*—Russell D Stormer

(57) ABSTRACT

A wheel including an annular hub and a plurality of curved spokes extending radially outward from the hub. Each spoke has an inner base adjacent the hub and an outer tip opposite the base. The wheel further includes an annular rim concentric with the hub and connected to the spokes adjacent their tips.

15 Claims, 6 Drawing Sheets

OTHER PUBLICATIONS

Michelin Press Release, "Michelin Lets The Air Out Of Future Tire Innovation; Michelin announces two fitments for its revolutionary non-pneumatic Tweel™," Jan. 9, 2005, www.michelinman.com/difference/releases/pressrelease01102005a.html. (2 pages).

* cited by examiner

NON-PNEUMATIC WHEEL

BACKGROUND OF THE INVENTION

The present invention relates to wheels and, more particularly, to non-pneumatic wheels for vehicles.

Until recently, conventional wheels for vehicles, such as automobiles, included an outer tire filled with air. These conventional wheels are commonly referred to as pneumatic wheels because they require air to function properly. A pneumatic wheel develops a "flat tire" when a foreign object punctures the outer tire, allowing the air to escape, rendering the wheel non-functional. Further, a sudden release of air when the vehicle is moving, known as a "blow-out," can be hazardous because control of the vehicle can quickly be lost. Since vehicles do not operate properly with flat tires, flat tires require repair or replacement. There is a need for a practical high-performance airless or non-pneumatic wheels.

Within the last few years, several non-pneumatic wheel designs have surfaced. However, these designs have various limitations. For example, some non-pneumatic wheel designs are complex, usually having multiple parts moving relative to each other. The complexity of these designs makes manufacturing and maintenance difficult and costly. Further, some non-pneumatic wheel designs are noisier than pneumatic wheels during use.

BRIEF SUMMARY OF THE INVENTION

In one aspect, the present invention relates to a wheel including a central hub and a plurality of curved spokes extending from the hub. Each spoke has a base adjacent the hub and a tip opposite the base. The wheel further includes a rim concentric with the hub and connected to the spokes adjacent their tips.

In another aspect, the present invention relates to a wheel comprising a central hub and a plurality of curved spokes extending from the hub. Each spoke has an inner base adjacent the hub and an outer tip opposite the base. The wheel further includes a rim concentric with the hub and connected to the spokes adjacent their tips.

In yet another aspect, the present invention relates to a vehicle including a body and an annular hub rotatably connected to the body. The vehicle further includes a plurality of curved spokes extending radially outward from the hub. Each spoke has an inner base adjacent the hub and an outer tip opposite the base. The vehicle also includes an annular rim concentric with the hub and connected to the spokes adjacent their tips.

Other aspects of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE INVENTION

Figure 1:
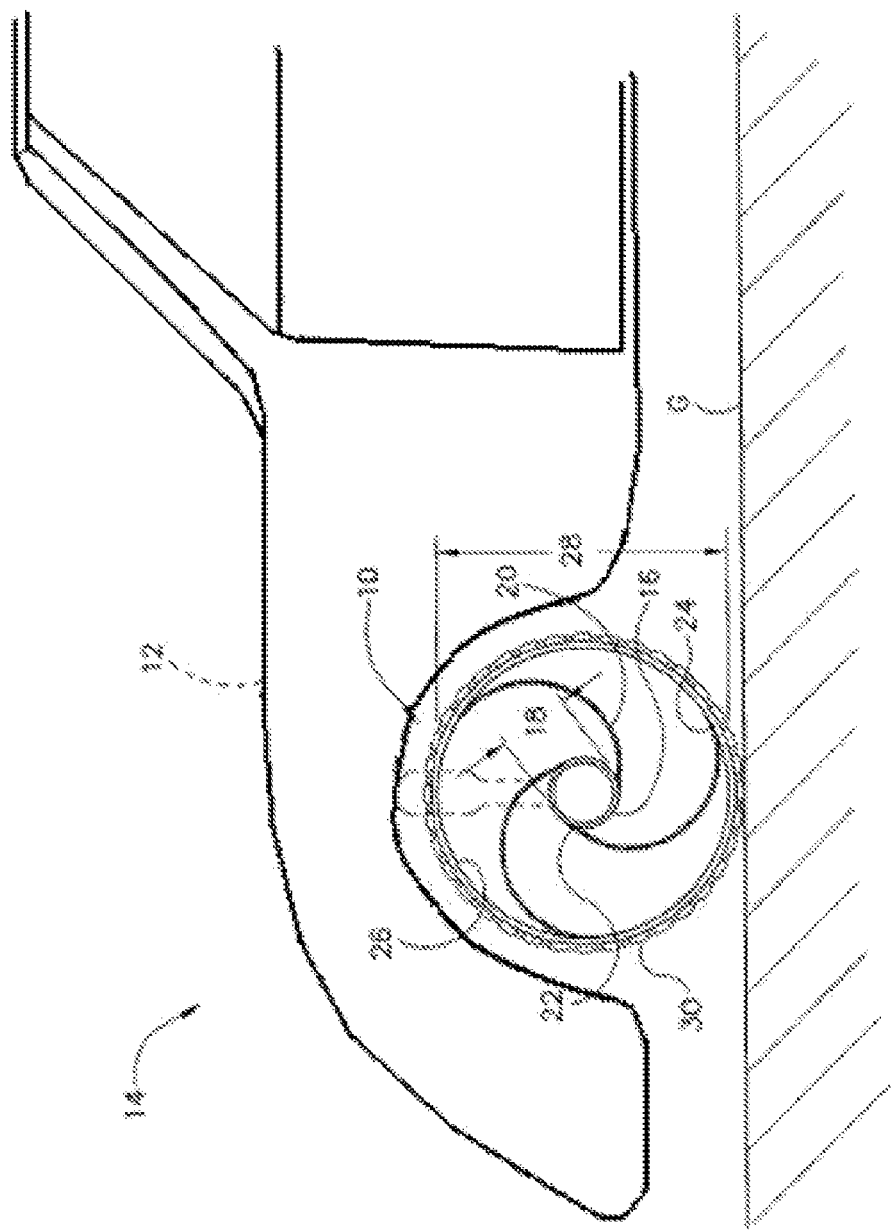
FIG. 1 is a side elevation of a vehicle having a wheel according to a first embodiment of the present invention.

Referring to the drawings, and more particularly to FIG. 1, a wheel according to a first embodiment of the present invention is designated in its entirety by reference number 10. The wheel 10 may be rotatably mounted to a body 12 of an automobile, generally designated 14. Although the wheel 10 is shown mounted on an automobile 14, the wheel 10 may be mounted on a wide variety of vehicles, such as aircraft, bicycles, all-terrain vehicles, and wheelchairs. Further, the wheel 10 may be used in ways other than for transporting a vehicle 14. For example, the wheel 10 may be used as an internal component for machinery (not shown) or wherever traditional wheels are used. The wheel 10 includes an annular hub 16 rotatably connected to the body 12. Although the hub 16 may be made of other materials without departing from the scope of the present invention, in one embodiment the hub is made of steel. Although the hub 16 may have other shapes without departing from the scope of the present invention, in one embodiment the hub is circular. Although the hub 16 may have other outer diameters 18, in one embodiment the hub has an outer diameter of between about 12 cm and about 22 cm. The wheel 10 further includes a plurality of curved or arcuate spokes 20 extending outward from the hub. Each spoke 20 has a base 22 adjacent the hub 16 and a tip 24 opposite the base. Although the spokes 20 may be made of other materials without departing from the scope of the present invention, in one embodiment the spokes are made of a metal, such as aluminum, or a metal alloy. In another embodiment, the spokes 20 are made of a composite or a polymer.

The wheel 10 further includes an annular rim 26 connected to the spokes 20 adjacent their tips 24. In one embodiment, the rim 26 is made of a material that allows it to deform in response to external loads on the rim, such as by the vehicle 14 weight and a surface or ground "G" on which the vehicle is driven. Although the rim 26 may be made of other materials without departing from the scope of the present invention, in one embodiment the rim is made of steel. Although the rim 26 may have other inner diameters 28, in one embodiment the rim has an inner diameter of between about 50 cm and about 75 cm. In one embodiment, the spokes 20 are preloaded. That is, the spokes 20 are formed or connected to the hub 16 and rim 26 such that the hub and rim compress the spokes between them to create a bending stress in the spokes when the wheel is not loaded by external forces. The spokes 20 are curved or arcuate even when the wheel 10 is not loaded by any external force. In use, the spokes 20 act as coils or springs transmitting generally outward and inward radial forces to the rim 26 to counter inward and outward radial loads. For example, the spokes 20 can counter the weight of the vehicle 14 and sporadic applications of force such as when the wheel 10 rolls over an object (not shown) on the ground during vehicle operation. When the vehicle 14 is placed on the ground G, the rim 26 deforms from its generally cylindrical original shape in response to the inward radial loads exerted on the wheel from the vehicle 14 and the ground. The spokes 20 push against the rim 26 adjacent the load from the ground to resist rim deformation and bias the rim toward its original shape.

Also, when the rim 26 becomes smaller in the vertical direction, it usually becomes larger in the horizontal direction. The spokes 20 may pull inwardly on the rim 26 adjacent locations of rim expansion to bias the rim toward its original shape. When the vehicle 14 rolls over an object, such as a speed bump, the rim 26 may deform radially inward beyond the deformation caused by the static load of the vehicle. In this case, the spokes 20 push against the rim 26 adjacent the deformation and pull inward on the rim at other locations to absorb the shock caused by the object.

The wheel 10 may further comprise a tire band or tread 30 connected to the rim 26. Although the tread 30 may be made of other materials without departing from the scope of the present material, in one embodiment the tread is made of an elastomer such as a rubber compound. In one embodiment, the tread 30 includes a primary contact surface 32 and side walls 34 (shown in FIG. 3). As will be appreciated by those skilled in the art, the tread 30 may be shaped and sized to achieve desired performance characteristics.

Figure 2:
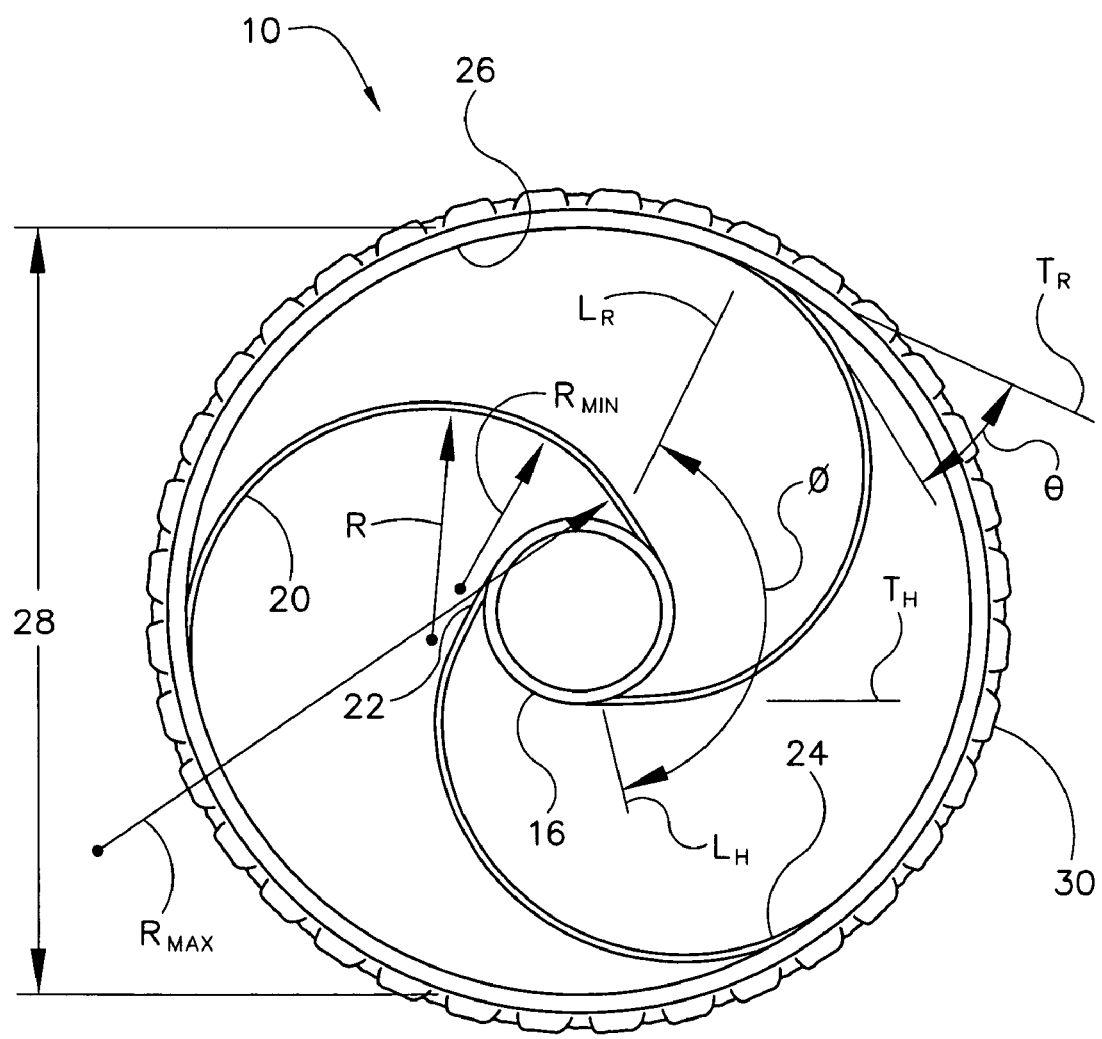
FIG. 2 is a side elevation of the wheel according to the first embodiment.

The spokes 20 can be connected to the hub 16 and the rim 26 in a variety of ways. For example, in one embodiment, the spokes 20 are welded to the hub 16 adjacent their bases 22 and welded to the rim 26 adjacent their tips 24. In another embodiment, the hub 16, the spokes 20, and the rim 26 are integrally formed. That is, the hub, the spokes, and the rim 16, 20, 26 may be formed as a unitary, one-piece, structure. One embodiment of the present invention is a method of forming a unitary wheel. In this embodiment, an elongate unitary hub, spokes, and rim (not shown) are formed, such as by extrusion and, then, the elongate structure is cut one or more times to form a plurality of unitary, one-piece, wheels 10. As shown in FIG. 2, the spokes 20 are connected to the hub 16 at respective circumferential spoke-to-hub locations "$L_H$" and connected to the rim 26 at respective circumferential spoke-to-rim locations "$L_R$". Although the wheel 10 may have other angles φ between each spoke-to-hub location and the corresponding spoke-to-rim location without departing from the scope of the present invention, in one embodiment the wheel has an angle between each spoke-to-hub location and the corresponding spoke-to-rim location of between about 5° and about 180°.

In one embodiment, each spoke 20 is generally tangential to the hub 16 adjacent its base 22. That is, each spoke 20, adjacent its base 22, is generally collinear with a tangent "$T_H$" of the hub 16 at the respective spoke-to-hub location "$L_H$". The spokes 20 adjacent their tips 24 meet the rim 26 at a spoke-to-rim angle θ. In one embodiment, each spoke-to-rim angle θ is between about 0° (i.e., the respective spoke 20 is generally tangential to the rim 26) and about 85°. That is, each spoke 20, adjacent its tip 24, may be generally collinear with a tangent "$T_R$" of the rim 26 or spaced from the tangent by an angle θ up to about 85° at the respective spoke-to-rim location "$L_R$".

Each spoke 20 has a radius of curvature "R". The radius of curvature R may be generally constant between the base 22 and tip 24 of each spoke 20 or it may vary. Although each spoke 20 may have other minimum radii of curvature "$R_{min}$" without departing from the scope of the present invention, in one embodiment each spoke has a minimum radius of curvature of between about 2 cm and about 3 cm. Although each spoke 20 may have other maximum radii of curvature "$R_{max}$" without departing from the scope of the present invention, in one embodiment each spoke has a maximum radius of curvature of between about 200 cm and about 300 cm.

Figure 3:
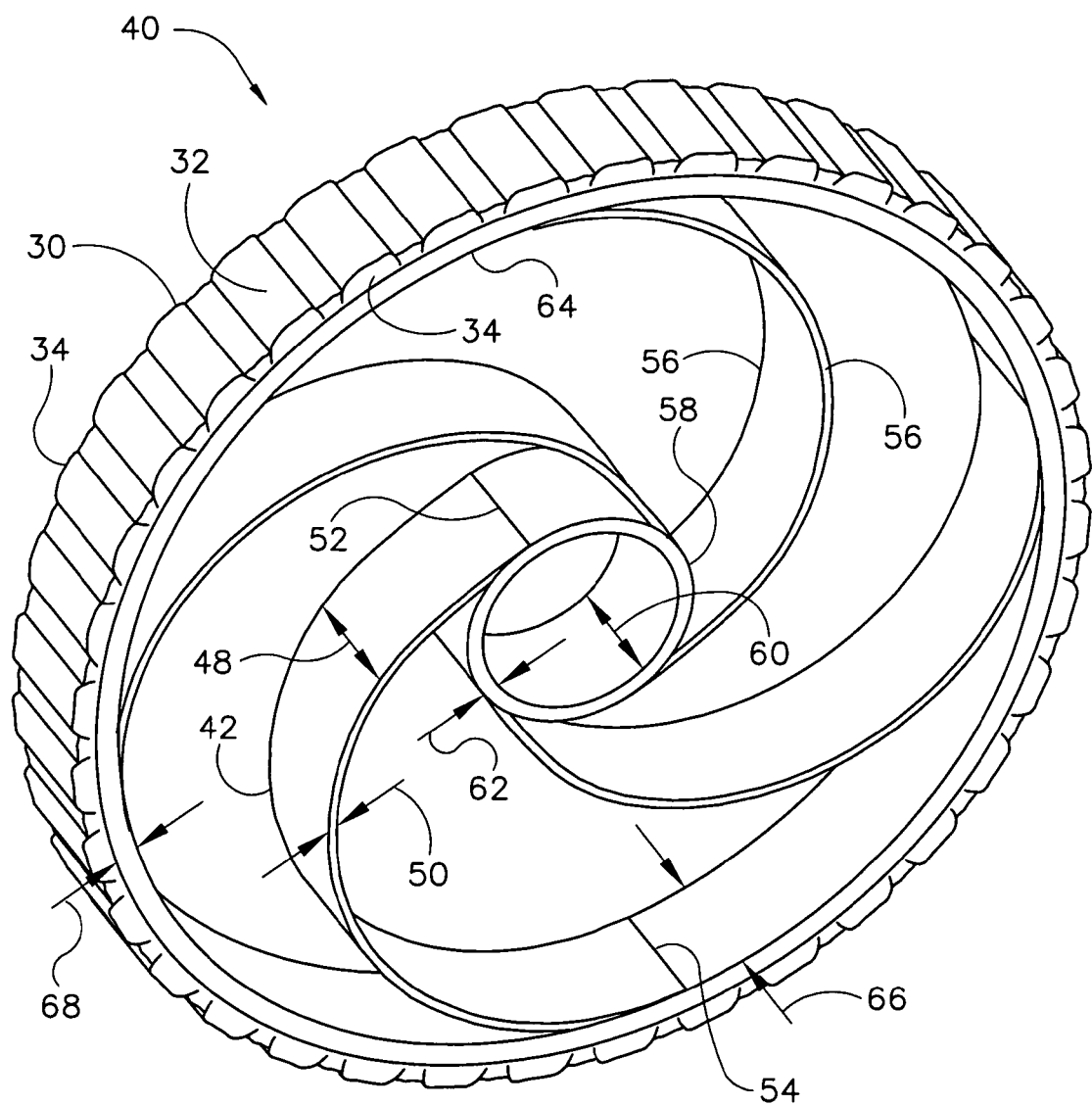
FIG. 3 is a perspective of a wheel according to a second embodiment of the present invention.
Figure 4:
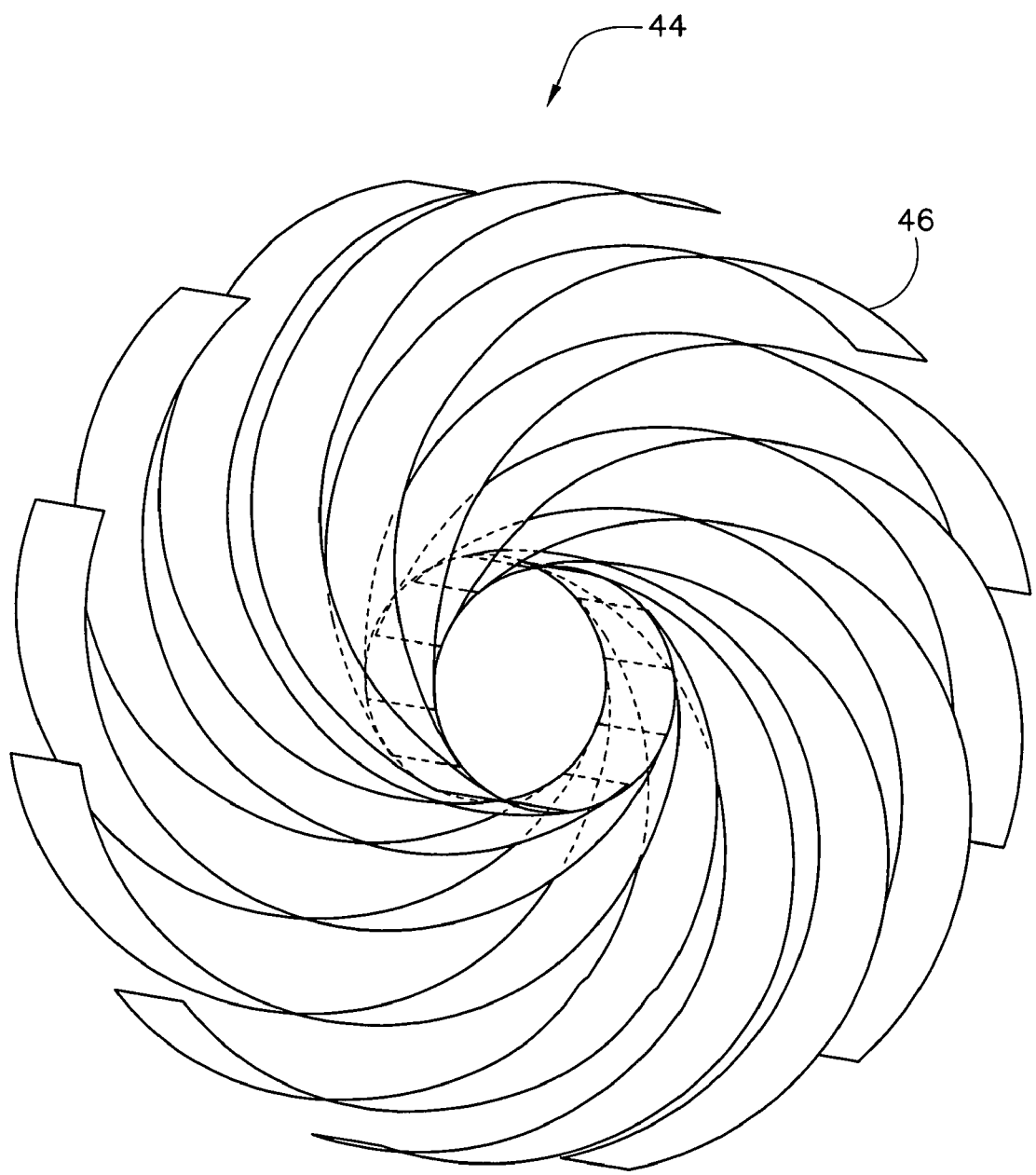
FIG. 4 is a perspective of a wheel according to a third embodiment of the present invention shown without a rim and tread.
Figure 4A:
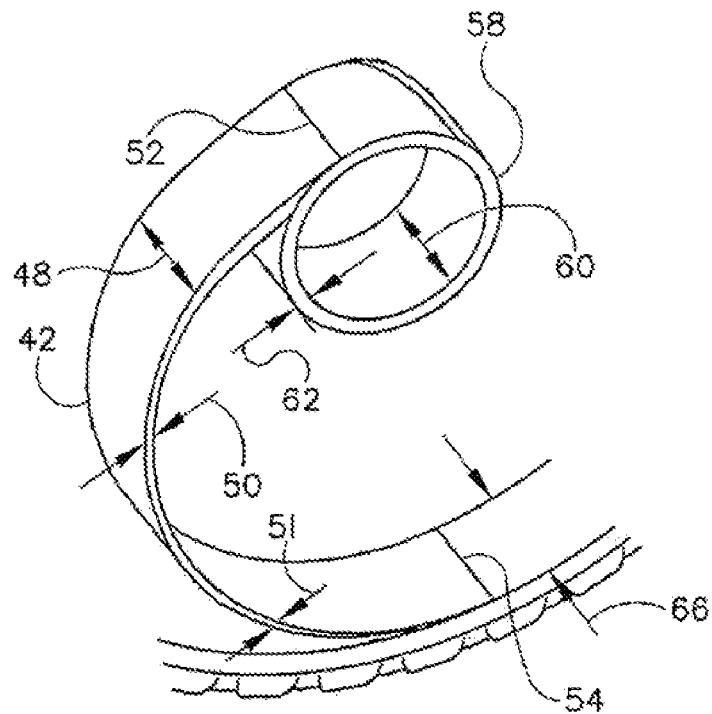
FIG. 4a is a partial perspective of a wheel and spoke including varying spoke thickness according to an alternative embodiment of the present invention.

Although the wheel 10 may have other number of spokes 20, in one embodiment the wheel has between about 3 spokes and about 12 spokes. FIG. 3 shows an embodiment of a wheel, generally designated by 40, having four spokes 42 and FIG. 4 shows an embodiment of a wheel (shown without a rim), generally designated by 44, having twelve spokes 46. The spokes 20, 42, 46 may have various cross-sectional shapes without departing from the scope of the present invention. For example, as shown in FIG. 3, each spoke 42 may have a generally rectangular cross section. In one embodiment, each spoke 42 has a ratio of width 48 to thickness 50 of between about 10:1 and about 60:1. Each spoke 42 may have a constant or varying thickness 50. For example, in one embodiment (shown in FIG. 4a), the thickness 50 of each spoke 42 varies between its base 52 and its tip 54 such as having the thickness 50 at a first location and a second thickness 51 at a second location. That is, each spoke 42 may have a greater thickness 50 at one location along the spoke between its base 52 and its tip 54 than at another location along the spoke between its base and its tip. Such variations in thickness 50 may be made to accommodate expected variances in stress distributions along each spoke 42. For example, if it is expected that the spokes 42 will be most stressed about midway between their tips 52 and bases 54, the spokes may have a larger thickness 50 at that location.

Figure 4B:
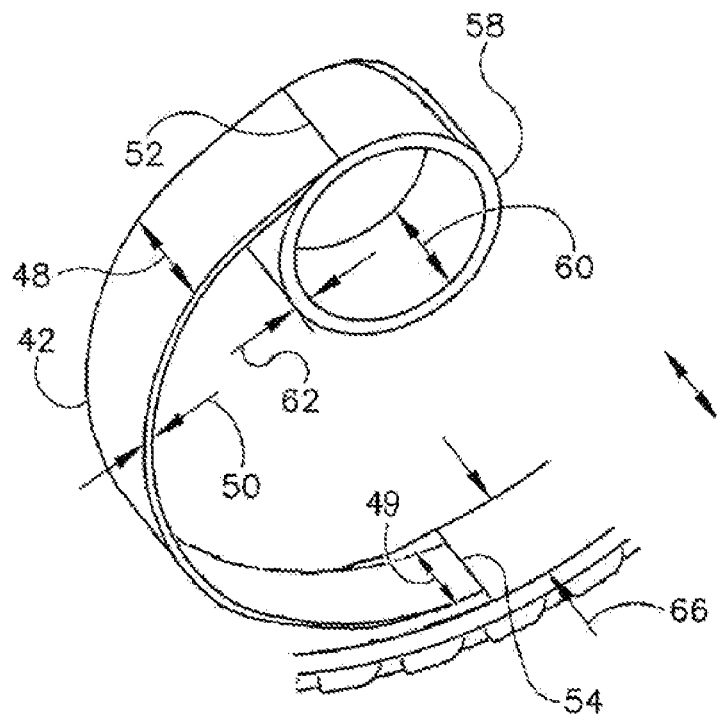
FIG. 4b is a partial perspective of a wheel and spoke including varying spoke width according to an alternative embodiment of the present invention.

In another embodiment (not shown), the spoke thickness 50 varies laterally across each spoke 42. That is, each spoke 42 may have a larger thickness 50 at one location between opposing sides 56 of the spoke than at another location between the sides. Such a varying thickness 50 between opposing sides 56 may provide desired lateral stability characteristics for the wheel 40. For example, spoke thickness 50 may be varied between the sides 56 to increase or decrease lateral stiffness of the wheel 40. Each spoke 42 may also have a varying width 48. For example, in one embodiment (shown in FIG. 4b), the spoke width 48 varies between its base 52 and its tip 54, such as having the width 48 at a first location and a second width 49 at a second location. That is, each spoke 42 may have a larger width 48 at one location along the spoke between its base 52 and its tip 54 than at another location along the spoke between its base and its tip. In another embodiment (not shown), the spoke width 48 varies laterally across each spoke 42. That is, each spoke 42 may have a larger width 48 at one location between opposing sides 56 than at another location between the sides. In one embodiment, the spokes 20, 42 are made of various materials to provide different physical characteristics in various areas of the spokes.

The hub 58 may have various cross-sectional shapes without departing from the scope of the present invention. For example, as shown in FIG. 3, the hub 58 may have a generally rectangular cross section. In one embodiment, the hub 58 has a ratio of width 60 to thickness 62 of between about 10:1 and about 60:1. The hub 58 may have a constant or varying width 60 and a constant or varying thickness 62. The rim 64 may have various cross-sectional shapes without departing from the scope of the present invention. As shown in FIG. 3, the rim 64 may have a generally rectangular cross section. In one embodiment, the rim 64 has a ratio of width 66 to thickness 68 of between about 10:1 and about 60:1. The rim 64 may have a constant or varying width 66 and a constant or varying thickness 68.

Figure 5:
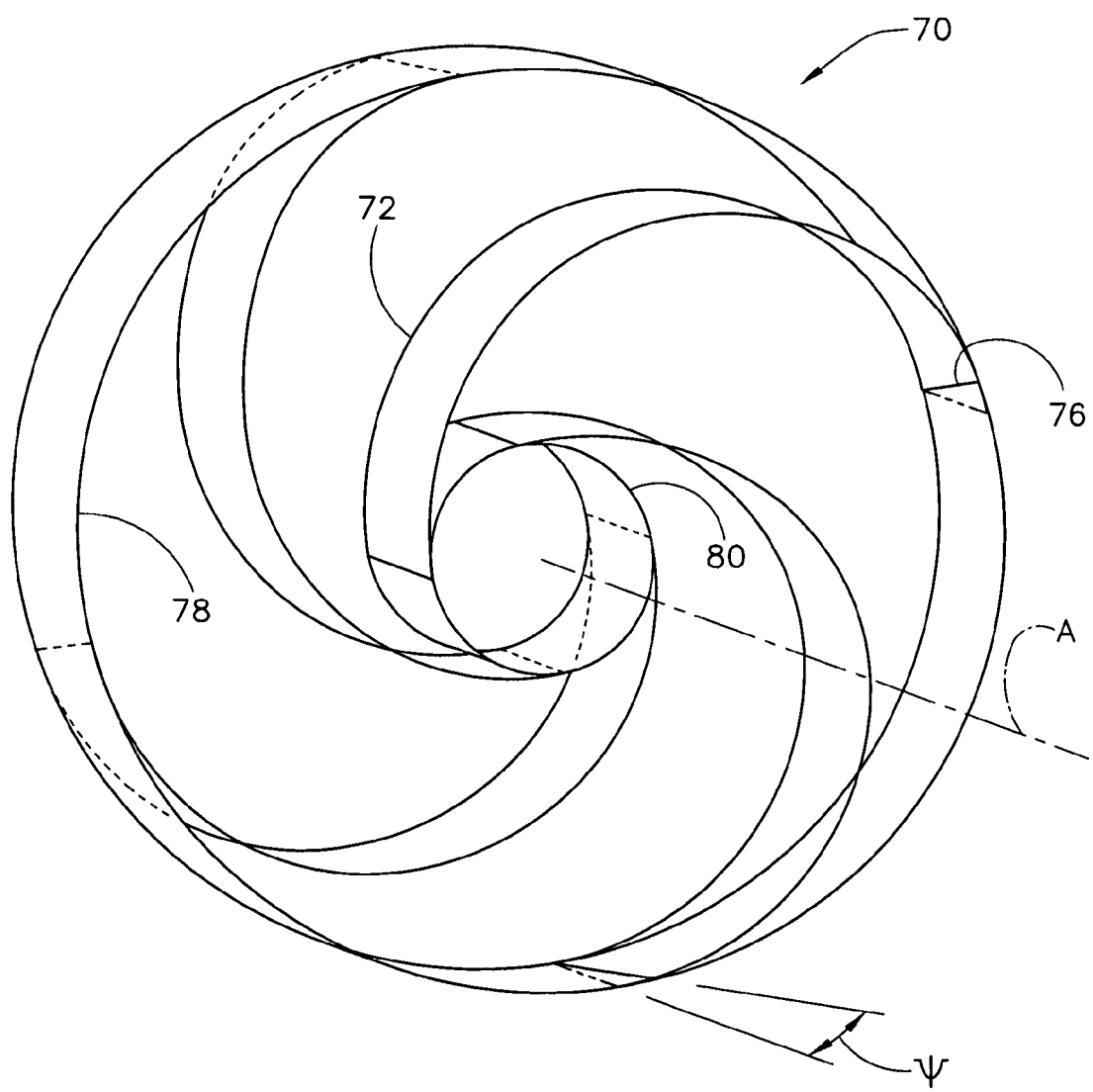
FIG. 5 is a perspective of a wheel according to a fourth embodiment of the present invention shown without a tread.

FIG. 5 shows a wheel, generally designated 70, according to the present invention wherein at least one of the spokes 72 is pitched between its base 74 and its tip 76. For example, instead of the spokes 72 meeting the rim 88 squarely (i.e., at an angle ψ of about 0°), as is the case with the wheels 10, 40 shown in FIGS. 1-3, the spokes may meet the rim at an angle ψ of between about 90° and about −90°, not including 0°. In another embodiment (not shown), at least one of the spokes 72 meets the rim 78 squarely (i.e., at an angle ψ of about 0°), but is pitched so it does not squarely meet the hub 80. In yet another embodiment (not shown), at least one of the spokes 72 meets the rim 78 and the hub 80 squarely, but is pitched (i.e., like a fan or propeller) between its base 74 and tip 76. The spokes 72 may be pitched so the spokes have desired bending characteristics and the wheel has desired strength characteristics. The spokes 72 may also be pitched to push air in a predetermined direction during use of the wheel. For example, one or more of the spokes 72 may be pitched so the spokes push air toward a brake assembly (not shown) of the vehicle to cool the assembly when the spokes rotate around a center axis "A" during use of the wheel.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A non-pneumatic wheel comprising:
   a hub;
   a brake assembly;
   a plurality of curved spokes extending from said hub, each spoke having an inner base adjacent the hub and an outer tip opposite the base, wherein the spokes are pitched to push air toward the brake assembly and also to obtain desired bending characteristics, the air facilitating cooling of the brake assembly when the spokes rotate around the hub;
   a rim concentric with said hub and connected to said spokes adjacent their tips; and a non-pneumatic tread on the rim.

2. A wheel as set forth in claim 1 wherein the base of each spoke extends generally tangential to said hub.

3. A wheel as set forth in claim 1 wherein the hub, the rim, and the spokes are unitary.

4. A wheel as set forth in claim 3 wherein the spokes are welded to the hub and to the rim.

5. A wheel as set forth in claim 1 wherein the spokes are made of a material selected from a group of materials including a composite and a polymer.

6. A wheel as set forth in claim 1 wherein each spoke has a minimum radius of curvature of between about 2 cm and about 3 cm.

7. A wheel as set forth in claim 1 where each spoke has a maximum radius of curvature of between about 200 cm and about 300 cm.

8. A wheel as set forth in claim 1 wherein each spoke has a width and a thickness and a ratio of said width to said thickness for each spoke is between about 10:1 and about 60:1.

9. A wheel as set forth in claim 8 wherein the thickness of each spoke varies between its base and its tip.

10. A wheel as set forth in claim 1 wherein each spoke has a varying thickness.

11. The wheel as set forth in claim 1 wherein each spoke is compressible so as to create bending stresses when compressed.

12. The wheel as set forth in claim 11 wherein the spokes have a spoke-to-rim angle between 0 and 85 degrees.

13. The wheel as set forth in claim 1 wherein the spokes are pitched at the base.

14. The wheel as set forth in claim 1 wherein each spoke has opposing sides and the thickness of each spoke varies between said sides.

15. A vehicle comprising:
    a body; and
    a non-pneumatic wheel including:
       an annular hub rotatably connected to said body;
       a plurality of curved, pitched spokes extending radially outward from said hub, each spoke having an inner base adjacent the hub and an outer tip opposite the base, each spoke being compressible so as to create bending stresses when compressed, the spokes pitched to obtain desired bending characteristics and also to push air toward a brake assembly, the air facilitating cooling of the brake assembly when the spokes rotate around the annular hub; and
    an annular rim connected to said spokes adjacent their tips; and
    a non-pneumatic tread coupled to the annular rim.

* * * * *